B. QUARELES.
DISH WASHER AND POT CLEANER.
APPLICATION FILED MAR. 16, 1910.
975,716.
Patented Nov. 15, 1910.
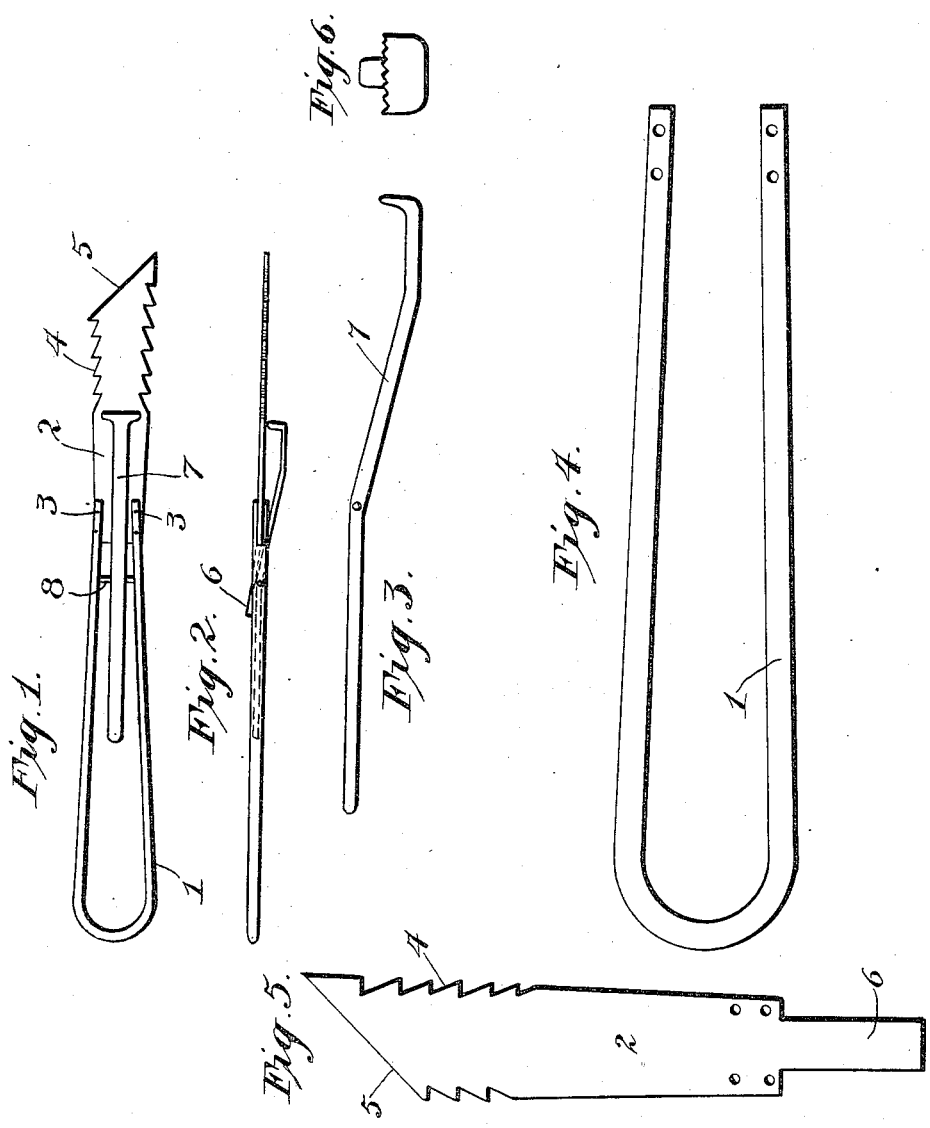

UNITED STATES PATENT OFFICE.

BELLE QUARELES, OF SAN FRANCISCO, CALIFORNIA, ASSIGNOR OF ONE-FOURTH TO THOMAS J. KISNER, OF SAN FRANCISCO, CALIFORNIA.

DISH-WASHER AND POT-CLEANER.

975,716.  Specification of Letters Patent.  Patented Nov. 15, 1910.

Application filed March 16, 1910.  Serial No. 549,790.

*To all whom it may concern:*

Be it known that I, BELLE QUARELES, a citizen of the United States, residing at San Francisco, in the county of San Francisco and State of California, have invented a new and useful Dish-Washer and Pot-Cleaner, of which the following is a specification in such full and clear terms as will enable those skilled in the art to construct and use the same.

This invention relates to a dish-washer and pot-cleaner and its object is to provide a means whereby dishes and pots may be washed in very hot water without having the hands come in contact with the dish cloth.

The object of the invention is to provide means whereby a cloth may be easily secured to the cleaning implement, and to provide an implement which may be used to scrape the bottoms of pans and pots, when material has been burned therein.

In the drawing in which the same numeral of reference is applied to the same portion throughout the several views, Figure 1 is a plan view of the scraper, Fig. 2 is a side elevation thereof, Fig. 3 is a side view of the cloth holding foot on a slightly larger scale, Fig. 4 is a plan view of the handle on a slightly larger scale, Fig. 5 is a plan view of the knife on a larger scale, and Fig. 6 is a view of the cloth holding foot.

The numeral 1 is applied to the handle of the device which is made of heavy steel wire bent into the U form, and having the ends thereof slotted to take the blade 2, with rivets 3 being provided to secure the blade to the handle. The blade 2 is provided with teeth 4 which are cut in the sides thereof, and has its end cut on a slant as shown at 5. The object of this diagonal cut at the end of the plate 2 is to provide means whereby the bottom and sides of pots may be scraped more readily than with a square cut blade. The blade has a spring 6 extending therefrom at the end, adjacent to handle. This spring bears on the handle of the cloth holding foot 7, which latter is pivoted to the handle at 8, the spring causing the cloth holding foot to bear quite heavily on the knife 2.

A dish cloth is wrapped loosely around the blade, the teeth 4 preventing it from slipping off the blade, and the cloth holding foot is placed on any portion of the cloth when it may be dipped in scalding water, and pots and pans or dishes cleaned therewith, while the lower edge 5 may be used to scrape the dirt out of pans or pots, on which it may be necessary so to do.

Having thus described my invention what I claim as new and desire to secure by Letters Patent of the United States, is as follows:

1. In a pot cleaner and scraper, a blade having its end cut diagonally, and having teeth on the sides thereof, a handle for said blade, a foot bearing on said blade, and a spring adapted to press said foot against said blade, to secure a cloth to said blade, as set forth.

2. In a pot cleaner and scraper, a blade having the end thereof cut diagonally and having teeth on the sides thereof, a handle secured thereto, a presser foot bearing on said blade, a handle for said presser foot and a spring integral with the blade and bearing on the handle to hold the latter in contact with said blade, as set forth.

In testimony whereof I have hereunto set my hand this 28 day of February A. D. 1910, in the presence of the two subscribed witnesses.

BELLE QUARELES.

Witnesses:
CHARLES R. HOLTON,
ROSWELL P. ROGERS.